(12) United States Patent
Kotecha et al.

(10) Patent No.: US 8,831,591 B2
(45) Date of Patent: Sep. 9, 2014

(54) AUTOMATIC RECONNECTION OF A DROPPED CALL

(75) Inventors: Lalit R. Kotecha, San Ramon, CA (US); Patricia Ruey-Jane Chang, San Ramon, CA (US); Benjamin J. Parker, Foster City, CA (US); David Chiang, Fremont, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 87 days.

(21) Appl. No.: 13/460,730

(22) Filed: Apr. 30, 2012

(65) Prior Publication Data
US 2013/0287198 A1    Oct. 31, 2013

(51) Int. Cl.
*H04Q 3/16*    (2006.01)
*H04M 7/00*    (2006.01)

(52) U.S. Cl.
USPC ..................................... 455/423; 379/221.04

(58) Field of Classification Search
CPC ..... H04W 92/02; H04W 36/14; H04W 28/18; H04W 76/028; H04W 36/0055; H04W 40/18; H04W 40/20; H04W 76/027

USPC ................. 455/423, 414.1, 436, 437, 445; 379/201.01, 221.04; 370/216, 217, 370/221, 338, 352, 353, 354, 355, 356, 357
See application file for complete search history.

(56) References Cited

U.S. PATENT DOCUMENTS

| 6,633,760 | B1* | 10/2003 | Ham et al. ................. 455/422.1 |
| 2001/0018342 | A1* | 8/2001 | Vialen et al. .................. 455/423 |
| 2002/0077104 | A1* | 6/2002 | Chen et al. .................... 455/436 |
| 2007/0274488 | A1* | 11/2007 | Callaghan ................ 379/201.01 |
| 2008/0146204 | A1* | 6/2008 | Gu et al. ..................... 455/414.1 |
| 2009/0247137 | A1* | 10/2009 | Awad ............................ 455/418 |
| 2010/0120414 | A1* | 5/2010 | Bellovin ....................... 455/423 |

\* cited by examiner

*Primary Examiner* — Fan Tsang
*Assistant Examiner* — Kharye Pope (57) ABSTRACT

A system is configured to receive an indication that a connection with a user device is to be lost, the connection being associated with a call between the user device and another user device; provide an instruction, to one or more devices, to maintain the call when the connection is lost, the one or more devices being responsible for processing the call; detect that the connection is lost; provide, to the one or more devices, a first notification that the connection is lost, the first notification causing the one or more devices to maintain the call based on the instruction to maintain the call when the connection is lost; detect that the connection is re-established; and provide, to the one or more devices, a second notification that the connection is re-established, the second notification causing the one or more devices to re-establish the call.

25 Claims, 8 Drawing Sheets

| ZONE ID 705 | ZONE INFORMATION 710 | BASE STATION INFORMATION 715-1 | ... | BASE STATION INFORMATION 715-P |
|---|---|---|---|---|
| A1 | Z1 | BS 120-1 / C1 | ... | BS 120-2 / C2 |
| A2 | Z2 | BS 120-2 / C1 | | BS 120-3 / C1 |

AUTOMATIC RECONNECTION OF A DROPPED CALL

BACKGROUND

User devices perform an increasing variety of tasks that allow users to make and receive calls, send and receive messages (e.g., emails, text messages, etc.), access and interact with the Internet, download and play audio and/or video content, make electronic purchases, communicate via social networking, etc. The user devices may establish connections with a network that enables the user devices to make calls with other user devices. The network may maintain the connections, while the user devices change locations, which enables the user devices to continue the calls. The network may maintain the connections via base stations and/or cells that provide coverage over geographical areas in which the user devices are moving. When the user devices enter an area for which there is no coverage, the connections may be lost which may cause the calls to be dropped by the network.

DETAILED DESCRIPTION OF PREFERRED EMBODIMENTS

The following detailed description refers to the accompanying drawings. The same reference numbers in different drawings may identify the same or similar elements.

Systems and/or methods, described herein, may enable a network device, such as a call handler, to temporarily suspend a call when a connection with a user device, with which the call is associated, is temporarily lost. Suspending the call may enable a network, which is handling the call, to avoid dropping the call for a time period during which the connection is lost. Avoiding a dropped call may improve a user experience and may reduce resources associated with re-establishing the call.

Additionally, or alternatively, the call handler may predict when and/or where a lost connection is likely to occur based on a location of the user device. The call handler may also, or alternatively, instruct the network to suspend the call by maintaining signal bearers and/or protocols, associated with the call. This may enable the network to temporarily maintain the call while the connection is lost. The call handler may also, or alternatively, instruct the user device and/or another user device, with which the call is associated, to not terminate the call while the call is suspended. The call handler may also, or alternatively, cause the other user device to be temporarily placed on hold and/or to be transferred to a server that provides information (e.g., advertising, music, instructions, etc.) that can be received by a user of the other user device.

The call handler may also, or alternatively, detect when the user device has reconnected with the network and may cause the call to be reestablished. The call handler may also, or alternatively, predict when the user device can be reconnected with the network based the location of the user device. The call handler may cause the other user device to be taken off hold and/or reconnected with the user device via the call.

Figure 1:
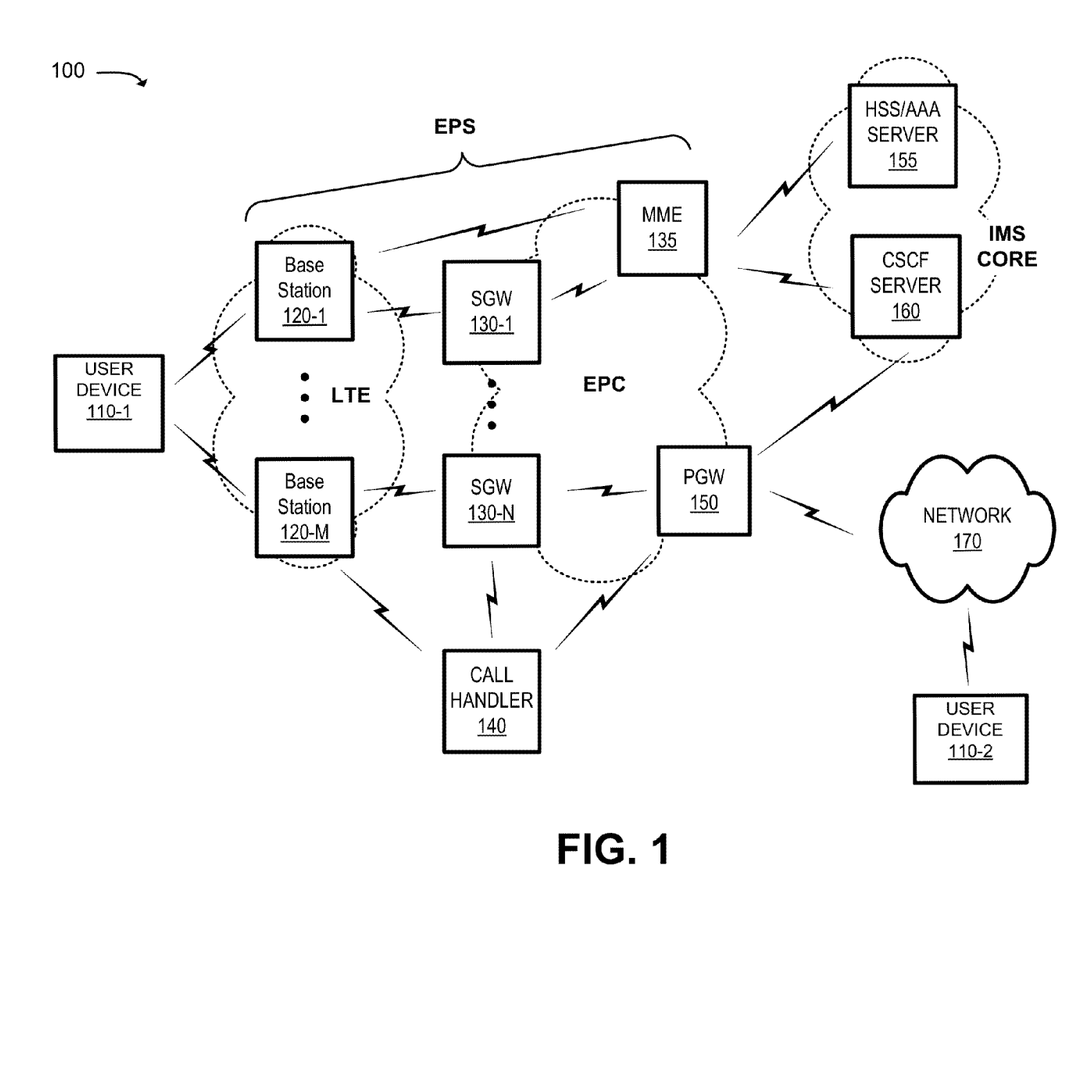
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a pair of user devices 110-1 and 110-2 (hereinafter referred to collectively as "user devices 110" and individually as "user device 110"); a group of base stations 120-1, ..., 120-M (where M≥1) (hereinafter referred to collectively as "base stations 120" and individually as "base station 120"); a group of serving gateways 130-1, ..., 130-N (where N≥1) (hereinafter referred to collectively as "SGWs 130" and individually as "SGW 130"); a mobility management entity device 135 (hereinafter referred to as "MME 135"); a call handler 140; a packet data network (PDN) gateway (PGW) 150 (hereinafter referred to as "PGW 150"); a home subscriber server (HSS)/authentication, authorization, accounting (AAA) server 155 (hereinafter referred to as an "HSS/AAA server 155"); a call session control function (CSCF) server 160 (hereinafter referred to as "CSCF server 160"); and a network 170.

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

Environment 100 may include an evolved packet system (EPS) that includes a long term evolution (LTE) network and/or an evolved packet core (EPC) network that operate based on a third generation partnership project (3GPP) wireless communication standard. The LTE network may be a radio access network (RAN) that includes one or more base stations 120, some or all of which, take the form of an eNodeB (eNB) via which user devices 110 communicate with the EPC network. The EPC network may include SGWs 130, MME 135, and/or PGWs 150, and may enable user devices 110 to communicate with network 170 and/or an Internet protocol (IP) multimedia subsystem (IMS) core network. The IMS core network may include HSS/AAA server 155 and/or CSCF server 160, and may manage authentication, session initiation, account information, a user profile, etc. associated with user devices 110.

User device 110 may include any computation and communication device, such as a wireless mobile communication device that is capable of communicating with base station 120 and/or a network (e.g., network 170). For example, user device 110 may include a radiotelephone; a personal communications system (PCS) terminal (e.g., that may combine a cellular radiotelephone with data processing and data communications capabilities); a personal digital assistant (PDA)

(e.g., that can include a radiotelephone, a pager, Internet/intranet access, etc.); a smart phone; a laptop computer; a tablet computer; a camera; a personal gaming system, or another type of mobile computation and communication device. User device 110 may send traffic to and/or receive traffic from network 170. User device 110 may also, or alternatively, include one or more components (e.g., global positioning system (GPS) components, etc.) that enable a location, associated with user device 110, to be identified.

Base station 120 may include one or more network devices that receive, process, and/or transmit traffic, such as audio, video, text, and/or other data, destined for and/or received from user device 110. In one example, base station 120 may be an eNB device and may be part of the LTE network. Additionally, or alternatively, one or more other base stations 120 may be associated with a RAN that is not associated with the LTE network (e.g., a wireless hot spot, a wireless access point, etc.). Base station 120 may receive traffic from and/or send traffic to network 170 via SGW 130 and PGW 150. Base station 120 may send traffic to and/or receive traffic from user device 110 via an air interface. Additionally, or alternatively, based station 120 may transmit a signal that notifies user device 110 that user device 110 is near and/or is entering a geographical area for which there is no coverage (hereinafter referred to as an "uncovered zone") from base station 120. By providing such a signal, base station 120 may act as a beacon that does not receive a signal from user device 110. Base station 120 may also, or alternatively, receive, from call handler 140, instructions to suspend a call. Base station 120 may, in response to the instructions, continue to perform signaling and/or maintain protocols (e.g., tunneling protocols, etc.), associated with the call, which may avoid terminating the call.

SGW 130 may include one or more network devices that gather, process, search, store, and/or provide information in a manner described herein. For example, SGW 130 may include a gateway, a router, a modem, a switch, a firewall, a network interface card (NIC), a hub, a bridge, a proxy server, an optical add-drop multiplexer (OADM), or some other type of device that processes and/or transfers traffic. SGW 130 may, for example, aggregate traffic received from one or more base stations 120 and may send the aggregated traffic to network 170 via PGW 150. SGW 130 may also, or alternatively, perform operations associated with handing off user device 110 from one base station 120 to another base station 120 that is served by SGW 130 and/or another SGW 130. SGW 130 may also, or alternatively, receive, from call handler 140, instructions to suspend a call. SGW 130 may, in response to the instructions, continue to perform signaling and/or maintain protocols (e.g., tunneling protocols, etc.), associated with the call, which may avoid terminating the call.

MME 135 may include one or more computation and communication devices that gather, process, search, store, and/or provide information in a manner described herein. For example, MME 135 may perform operations associated with a handoff to and/or from the EPS. MME 135 may perform operations to register user device 110 with the EPS, to handoff user device 110 from the EPS to another network, to handoff user device 110 from the other network to the EPS, and/or to perform other operations. MME 135 may perform policing operations on traffic destined for and/or received from user device 110.

Call handler 140 may include one or more computation and communication devices that gather, process, search, store, and/or provide information in a manner described herein. Call handler 140 may, for example, communicate with base station 120 to detect when user device 110 has lost a connection with base station 120. Call handler 140 may also, or alternatively, track a location associated with user device 110 to determine whether user device 110 is entering an uncovered zone, which may cause a connection, between user device 110 and base station 120, to be lost. Call handler 140 may provide an instruction to signal bearers, such as base station 120, SGW 130, and/or PGW 150, to suspend a call, associated with user device 110, when the connection is lost.

Additionally, or alternatively, call handler 140 may instruct user device 110 and/or another user device 110, with which user device 110 is communicating, to not terminate the call (e.g., to not hang up) when call handler 140 determines that user device 110 is entering the uncovered zone. Call handler 140 may also, or alternatively, cause the other user device 110 to be placed on hold and/or connected to a conference bridge, hosted by call handler 140, when user device 110 is entering the uncovered zone. Placing the other user device 110 on hold and/or transferring the other user device 110 to the conference bridge may enable call handler 140 to provide content to the other user device 110. The content may, for example, correspond to text, audio, video, and/or data content associated with advertising, music, instructions, etc. Call handler 140 may also, or alternatively, detect when user device 110 has reconnected with base station 120 and may cause user device 110 and the other user device 110 to be reconnected via the call.

PGW 150 may include one or more network devices, or other types of computation and communication devices, that gather, process, search, store, and/or provide information in a manner described herein. For example, PGW 150 may include a gateway, a router, a modem, a switch, a firewall, a NIC, a hub, a bridge, a proxy server, an OADM, or some other type of device that processes and/or transfers traffic. PGW 150 may aggregate traffic received from one or more SGWs 130, etc. and may send the aggregated traffic to network 170. PGW 150 may also, or alternatively, receive traffic from network 170 and may send the traffic toward user device 110 via SGW 130 and/or base station 120. PGW 150 may provide the content, to user device 110 and via SGW 130 and/or base station 120, in a format supported by user device 110 and/or at a quality of service (QoS) to which a user of user device 110 has subscribed. PGW 150 may also, or alternatively, receive instructions, from call handler 140, to suspend a call and PGW 150 may, in response to the instruction, continue to perform signaling and/or maintain protocols (e.g., tunneling protocols, etc.), associated with the call, which may avoid terminating the call.

HSS/AAA server 155 may include one or more server devices, or other types of devices, that gather, process, search, store, and/or provide information in a manner described herein. For example, HSS/AAA server 155 may manage, update, and/or store, in a memory associated with HSS/AAA server 155, profile information associated with user device 110. The profile information may identify applications and/or services that are permitted for and/or accessible by user device 110; bandwidth or data rate thresholds associated with the applications and/or services; information associated with a user of user device 110 (e.g., a username, a password, a personal identification number (PIN), etc.); rate information; minutes allowed; and/or other information. Additionally, or alternatively, HSS/AAA server 155 may perform authentication, authorization, and/or accounting (AAA) operations associated with a communication session with user device 110.

CSCF server 160 may include one or more server devices, or other types of devices, that gather, process, search, store, and/or provide information in a manner described herein. CSCF server 160 may process and/or route calls to and from user device 110 via the EPC network. For example, CSCF server 160 may process calls, received from network 170, that are destined for user device 110. Alternatively, or additionally, CSCF server 160 may process calls, received from user device 110, that are destined for network 170.

Network 170 may include one or more wired and/or wireless networks. For example, network 170 may include a cellular network, a public land mobile network (PLMN), a second generation (2G) network, a third generation (3G) network, a fourth generation (4G) network, a fifth generation (5G) network, and/or another network. Additionally, or alternatively, network 170 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

Figure 2:
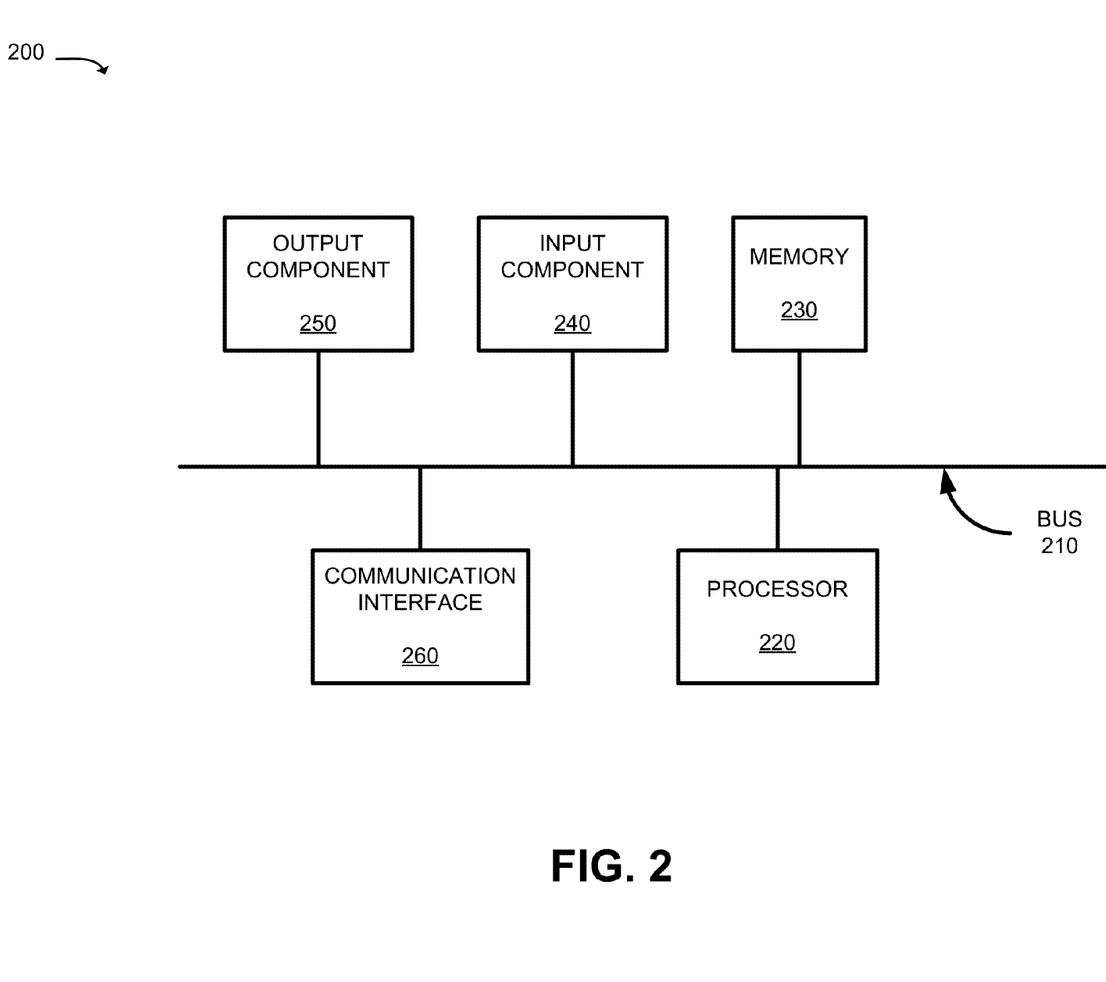
FIG. 2 is a diagram of example components of one or more devices of FIG. 1.

FIG. 2 is a diagram of example components of a device 200. Device 200 may correspond to user device 110, SGW 130, MME 135, call handler 140, PGW 150, HSS/AAA server 155, and/or CSCF server 160. Alternatively, or additionally, each of user device 110, SGW 130, MME 135, call handler 140, PGW 150, HSS/AAA server 155, and/or CSCF server 160 may include one or more devices 200 and/or one or more components of device 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications, wired communications, or a combination of wireless and wired communications. For example, communication interface 260 may include mechanisms for communicating with another device or system via a network, such as network 170. Alternatively, or additionally, communication interface 260 may be a logical component that includes input and output ports, input and output systems, and/or other input and output components that facilitate the transmission of data to other devices.

Device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
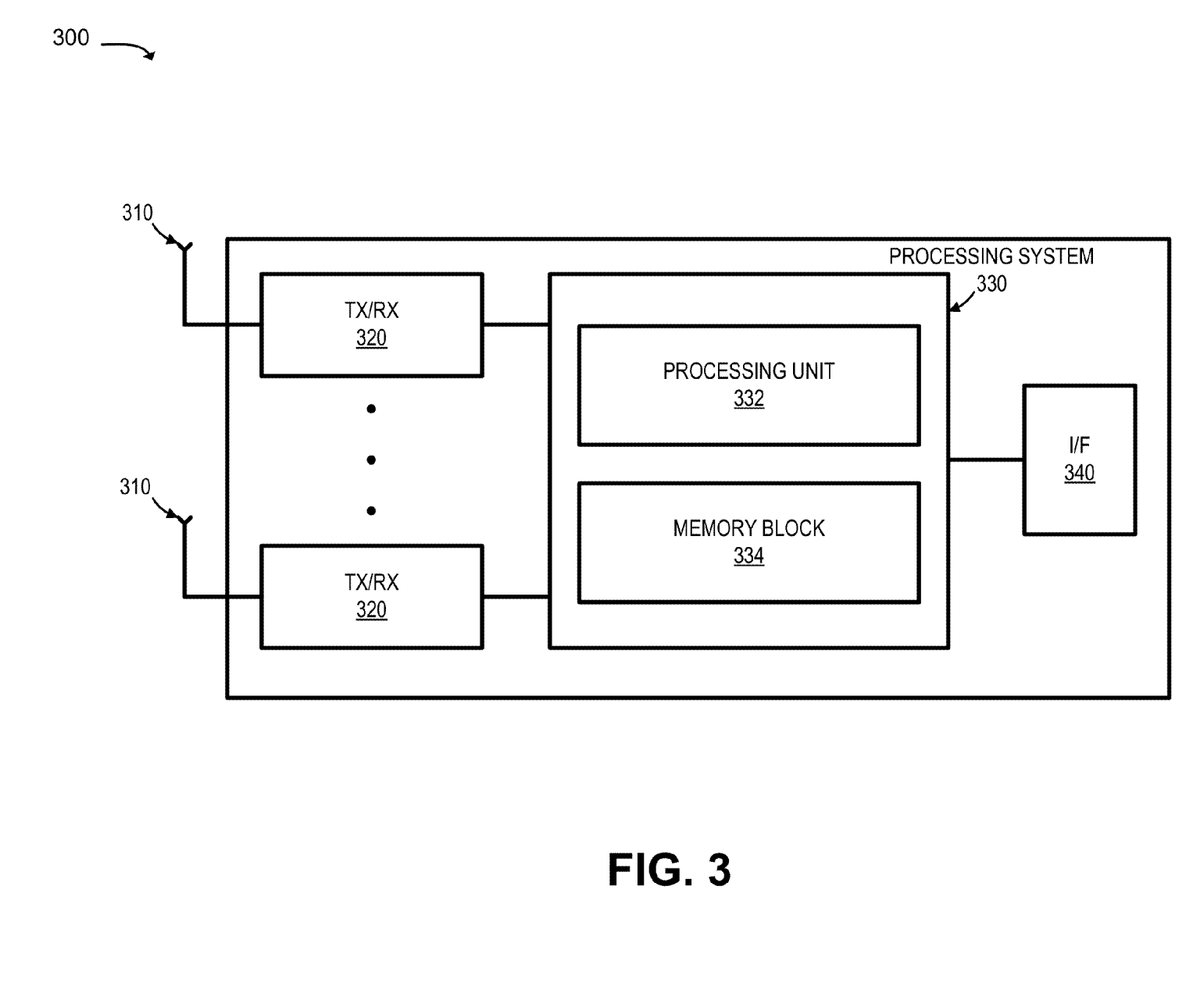
FIG. 3 is a diagram of example components of a base station of FIG. 1.

FIG. 3 is a diagram of example components of base station 120 according to an implementation described herein. As shown in FIG. 3, base station 120 may include antennas 310, transceivers (TX/RX) 320, a processing system 330, and an interface (I/F) 340. Base station 120 may include fewer components, additional components, different components, and/or differently arranged components than those illustrated in FIG. 3. Additionally, or alternatively, one or more operations described as being performed by a particular component of base station 120 may be performed by one or more other components, in addition to or instead of the particular component of base station 120.

Antennas 310 may include one or more directional and/or omnidirectional antennas. Transceivers 320 may be associated with antennas 310 and may include transceiver circuitry for transmitting and/or receiving traffic within a network, such as a wireless network, via antennas 310.

Processing system 330 may control the operation of base station 120. Processing system 330 may also process information received via transceivers 320 and interface 340. Processing system 330 may further measure quality and strength of a connection and determine a frame error rate (FER), and transmit this information to MME 135 and/or some other device. As illustrated, processing system 330 may include a processing unit 332 and a memory block 334. Alternatively, or additionally, processing system 330 may include fewer components, additional components, different components, and/or differently arranged components than illustrated in FIG. 3.

Processing unit 332 may include one or more processors, microprocessors, etc, and may process information received via transceivers 320 and interface 340. The processing may include, for example, data conversion, forward error correction (FEC), rate adaptation, Wideband Code Division Multiple Access (WCDMA) spreading/dispreading, and quadrature phase shift keying (QPSK) modulation, etc. In addition, processing unit 332 may generate control messages and/or data messages (e.g., within high speed-downlink shared channel (HS-DSCH) data frames) and cause those control messages and/or data messages to be transmitted via transceivers 320 and/or interface 340. Processing unit 332 may also process control messages and/or data messages received from transceivers 320 and/or interface 340.

Memory block 334 may include any type of dynamic storage device that may store information and instructions, for execution by processing unit 332, and/or any type of non-volatile storage device that may store information for use by processing unit 332. Interface 340 may include one or more input/output components that allow base station 120 to transmit data to and receive data from SGW 130, MME 135, cache server 170, etc.

Figure 4:
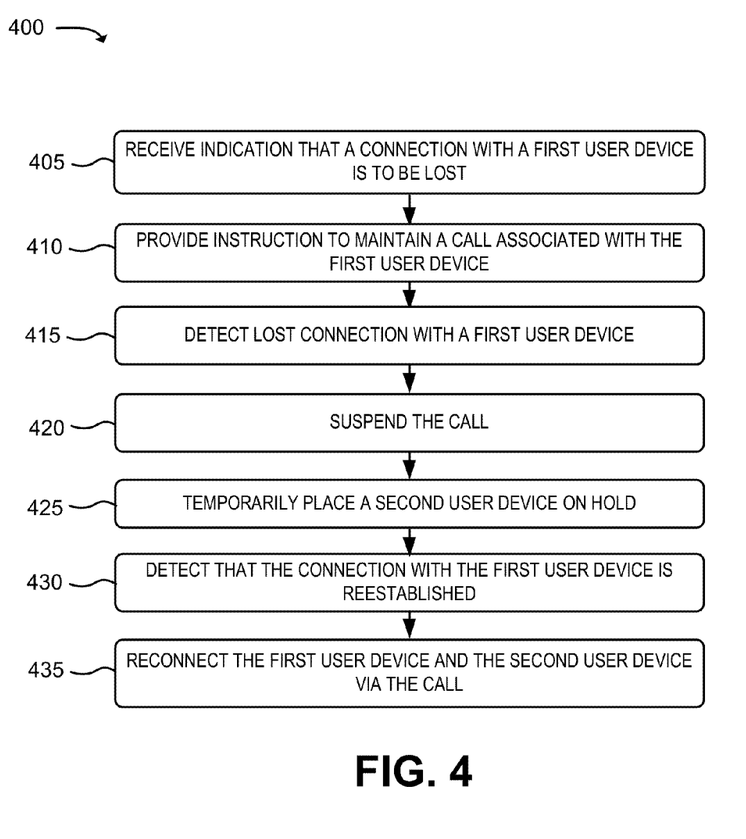
FIG. 4 is a flow chart of an example process for suspending a call when a call is lost.

FIG. 4 is a flow chart of an example process 400 for suspending a call when a call is dropped. In one example implementation, process 400 may be performed by call handler

Figure 5:
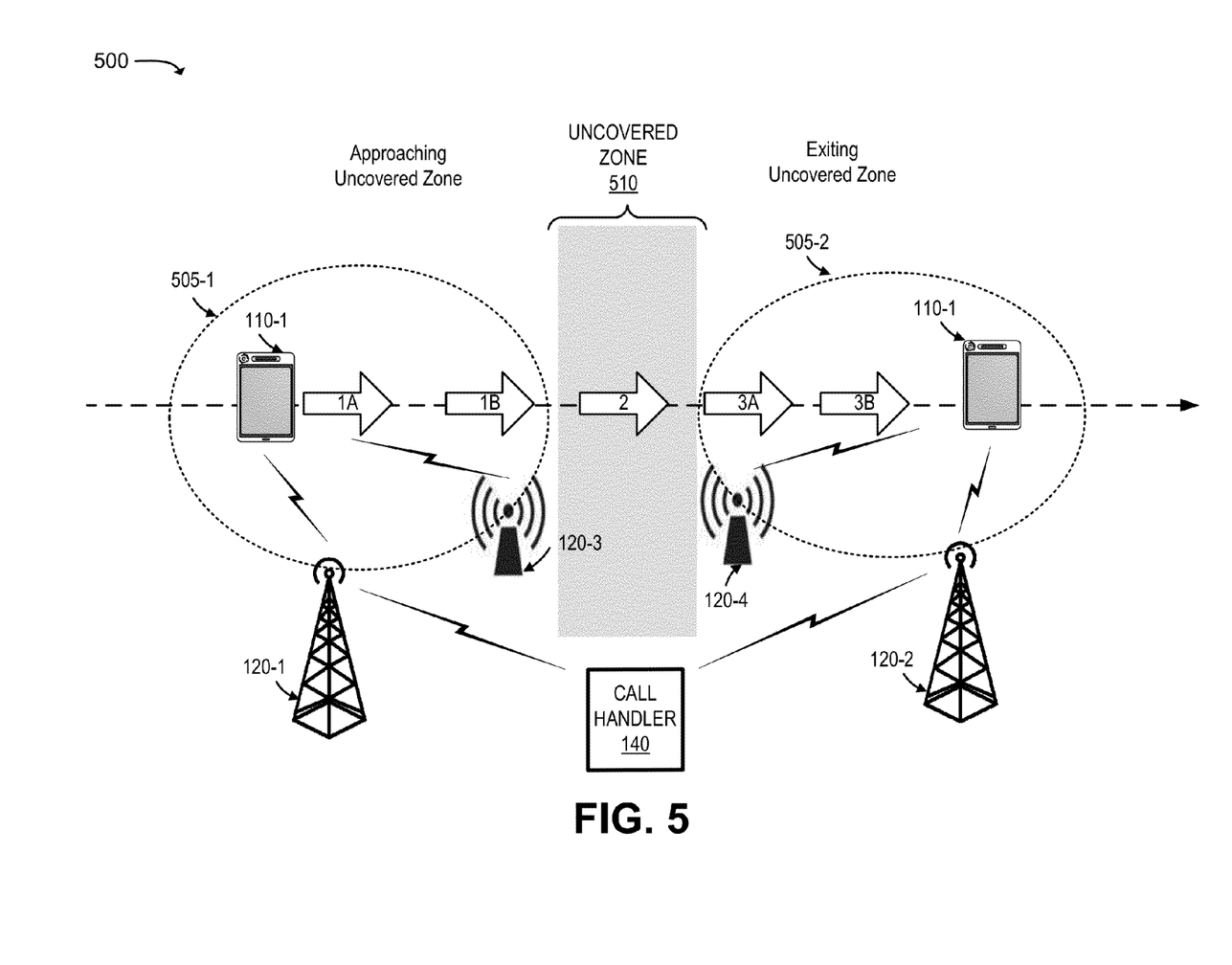
FIG. 5 is a diagram of an example portion of the environment of FIG. 1.

140. Additionally, or alternatively, some or all of process 400 may be performed by a device or collection of devices separate from, or in combination with, call handler 140. FIG. 5 is a diagram of an example portion 500 of environment 100. As illustrated in FIG. 5, example portion 500 may include user device 110-1, base stations 120-1-120-4, and call handler 140. User device 110-1, base stations 120-1-120-4, and call handler 140 may include features described above in connection with FIGS. 1-3. In the description below, a portion of process 400 of FIG. 4 will be described with references to example environment portion 500 of FIG. 5.

As shown in FIG. 4, process 400 may include receiving an indication that a connection with a first user device is to be lost (block 405). For example, call handler 140 may receive, from user device 110-1, a notification that user device 110-1 is about to enter an uncovered zone. For example, as illustrated in FIG. 5, user device 110-1 may be communicating with user device 110-2 (not shown), via base station 120-1, while user device 110-1 is moving (e.g., as shown by the arrow labeled as 1A) within a first geographical area 505-1. Geographical area 505-1 may correspond to a geographical area that is covered by one or more cells associated with base station 120-1.

In one example, user device 110-1 may provide the notification, to call handler 140, when user device 110-1 determines that an uncovered zone 510 is being approached and/or that a loss of connection with user device 110-1 is imminent (e.g., within one second, five seconds, ten seconds, thirty seconds, one minute, etc.). Uncovered zone 510 may correspond to a geographical area for which there is no cell coverage from base station 120-1 and/or base station 120-2. User device 110-1 may base the determination on location information associated with user device 110-1 and/or coverage information received from call handler 140 and/or retrieved from a memory associated with user device 110-1. The coverage information, to be described in greater detail below with respect to FIG. 7, may identify one or more geographical areas that correspond to uncovered zone 510.

Additionally, or alternatively, user device 110-1 may provide the notification, to call handler 140, when a signal, from base station 120-3, is received while user device 110-1 is moving (e.g., as shown by the arrow labeled as 1B) within first geographical area 505-1. In this example, base station 120-3 may be located at or near (e.g., within 10 feet (ft.), 100 ft., 1000 ft., 1 mile, etc.) a boundary of uncovered zone 510 (e.g., at an entrance of a tunnel, a bridge, etc. for which there is no coverage). Additionally, or alternatively, base station 120-3 may represent a beacon that transmits a signal that notifies user device 110-1 that uncovered zone 510 is being approached and/or that a loss of connection is imminent. In one example, base station 120-3 may not receive communications from user device 110. Additionally, or alternatively, base station 120-3 may correspond to a wireless hotspot or the like. User device 110-1 may receive the signal and may provide the notification to base station 120-1.

Additionally, or alternatively, call handler 140 may receive, from user device 110-1, location information associated with user device 110-1 and may determine that user device 110-1 is approaching uncovered zone 510. Additionally, or alternatively, user device 110-1 may determine that signal power, associated with a connection with base station 120-1, has dropped to a level that is below a threshold. User device 110-1 may provide, to call handler 120 and via base station 120-1, a notification that the signal power has dropped to the level that is below the threshold. Call handler 140 may receive the notification and may determine that a lost connection is imminent.

Returning to FIG. 4, process 400 may include providing an instruction to maintain a call associated with the first user device (block 410). For example, when a connection with user device 110-1 is lost, call handler 140, may transmit an instruction that instructs signal bearers, such as base station 120-1, SGW 130, and PGW 150, to prepare to temporarily suspend a call via which user device 110-1 is communicating. The instruction may cause the signal bearers to not terminate signaling and/or protocols that are used to maintain the call when the connection is lost. Additionally, or alternatively, the instruction may identify a period of time that the call is expected to be suspended.

Additionally, or alternatively, call handler 140 may provide an instruction to user device 110-1, via base station 120-1, to not terminate the call when the connection between base station 120-1 and user device 110-1 is lost. The instruction may, for example, identify a period of time that the connection is expected to be lost. The instruction may also, or alternatively, identify a second base station 120 (e.g., base station 120-2) with which user device 110-1 is to communicate to re-establish a connection. Additionally, or alternatively, call handler 140 may provide, to user device 110-1, a notification, such as, for example, a text message, an audio message, a video message, etc. The notification may alert a user, of user device 110-1, that the connection may be temporarily lost, that the user should not hang up, and/or that the call may continue when user device 110-1 exits uncovered zone 510 and/or when the connection is re-established. In one example, call handler 140 may provide, to user device 110-1, information that identifies all or a combination of the instruction not to terminate the call, the period of time the connection is expected to be lost, the instruction to communicate with the second base station 120, and/or the notification that alerts the user.

Additionally, or alternatively, call handler 140 may provide a notification, to user device 110-2 and via PGW 150, that indicates that a connection with user device 110-1 may be temporarily lost. The notification may include an instruction for user device 110-2 to not terminate the call when the connection is lost. The instruction may also, or alternatively, identify a period of time that the connection is expected to be lost. Additionally, or alternatively, the notification may include a message, such as, for example, a text message, an audio message, a video message, etc. The message may alert a user, of user device 110-2, that the connection may be temporarily lost, that the user should not hang up, and/or that user device 110-2 may be placed on hold and/or transferred for a period of time until the connection is re-established.

Additionally, or alternatively, call handler 140 may determine that user device 110-1 is leaving a first cell associated with base station 120-1 and may enter a second cell associated with a different base station (e.g., base station 120-2) when user device 110-1 emerges from uncovered zone 510. In this example, call handler 140 may transmit a notification to MME 135 (e.g., that serves base station 120-1 and/or base station 120-2) indicating that user device 110-1 is to be handed off to the second cell, associated with base station 120-2, when user device 110-1 emerges from uncovered zone 510. MME 135 may receive the notification and may cause base station 120-1 to instruct user device 110-1 to communicate with base station 120-2 when user device 110-1 leaves uncovered zone 510. MME 135 may also, or alternatively, instruct SGW 130 to establish signal bearers for the handoff when user device 110-1 is entering uncovered zone 510 and/or after the connection, with base station 120-1, is lost. The bearer request may cause SGW 130 to establish a network path (e.g., via a tunneling protocol and/or some other protocol) associated with base station 120-2 via which the suspended call may be established and/or maintained. MME 135 may also, or alternatively, instruct base station 120-2 to establish a connection, with user device 110-1, when user device 110-1 exits uncovered zone 510. In this example, base station 120-2 may provide, to user device 110-1, configuration information (e.g., that identifies protocols, channels, policies, etc.) that is to be used when communicating with base station 120-2.

As also shown in FIG. 4, process 400 may include detecting a lost connection with the first user device (block 415). For example, call handler 140 may monitor traffic flows being processed by base station 120-1 and may detect that a connection between user device 110-1 and base station 120-1 is lost when packets are no longer being received from user device 110-1. Additionally, or alternatively, call handler 140 may detect the lost connection based on a notification, received from base station 120-1, that the connection is lost.

For example, as illustrated in FIG. 5, user device 110-1 may leave geographical area 505-1 and enter uncovered zone 510 (e.g., as shown by the arrow labeled as 2), which may cause a connection, between user device 110-1 and base station 120-1 to be lost. Additionally, the connection may be lost for a period of time during which user device 110-1 remains within uncovered zone 510.

Returning to FIG. 4, process 400 may include suspending the call (block 420) and temporarily placing a second user device on hold (block 425). For example, call handler 140 may transmit, to the signal bearers (e.g., base station 120-1, SGW 130, and/or PGW 150), a notification that the connection with user device 110-1 has been lost. The signal bearers may receive the notification and may suspend the call. The signal bearers may, for example, maintain the signaling and/or protocols (e.g., tunneling protocols, etc.) on which the call is based, which may enable the call to not be dropped.

Additionally, or alternatively, call handler 140 may provide a notification, to user device 110-2 and via PGW 150, that indicates that user device 110-1 is temporarily disconnected, and/or may instruct user device 110-2 to not terminate the call. Additionally, or alternatively, call handler 140 may cause user device 110-2 to be placed on hold and/or may cause the call to be transferred to call handler 140. In one example, call handler 140 may establish a conference bridge and may cause the call to be transferred to the conference bridge. Call handler 140 may also, or alternatively, provide an audio message (e.g., via the conference bridge) to user device 110-2 that instructs a user of user device 110-2 to not hang up. Additionally, or alternatively, call handler 140 may provide content (e.g., audio content, video content, etc.) to user device 110-2, such as advertising content, music, etc.

As further shown in FIG. 4, process 400 may include detecting that the connection with the first user device is reestablished (block 430). For example, call handler 140 may monitor traffic flows being processed by base station 120-2 and may detect that a connection between user device 110-1 and base station 120-2 has been established. Additionally, or alternatively, call handler 140 may receive a notification, from base station 120-2, that user device 110-1 is connected with base station 120-2.

For example, as illustrated in FIG. 5, user device 110-1 may be exit uncovered zone 510 and may enter a geographical area 505-2 (e.g., as shown by the arrow labeled as 3A). User device 110-1 may also, or alternatively, receive a signal, from base station 120-4, that indicates that user device 110-1 is leaving uncovered zone 510 and/or entering geographical area 505-2.

Geographical area 505-2 may be covered by one or more cells associated with base station 120-2. In this example, base station 120-4 may be located at or near (e.g., within 10 feet, 100 feet, 1000 ft., 1 mile, etc.) a boundary of uncovered zone 510 (e.g., at an exit of a tunnel, a bridge, etc. for which there is no coverage). Additionally, or alternatively, base station 120-4 may act as a beacon that transmits a signal notifying user device 110-1 that uncovered zone 510 is being exited and/or that user device 110-1 can connect to base station 120-2. In one example, base station 120-4 may not receive communications from user device 110. Additionally, or alternatively, base station 120-4 may correspond to a wireless hotspot or the like. User device 110-1 may, as a result of receiving the signal, transmit a request, to base station 120-2, to establish a connection. Base station 120-2 may receive the request and may communicate with user device 110-1 to establish the connection. Call handler 140 may detect when user device 110-1 is connected by monitoring traffic, received from user device 110-1, being processed by base station 120-2. Base station 120-2 may also, or alternatively, provide a notification, to call handler 140, indicating that a connection, with user device 110-1, has been established.

Additionally, or alternatively, user device 110-1 may repeatedly transmit the request to connect as user device 110-1 is leaving uncovered zone 510 and/or entering geographical area 505-2 (e.g., as shown by the arrow labeled as 3B) and base station 120-2 may receive the request. User device 110-1 may, in this example, transmit the request without receiving the signal from base station 120-4.

Additionally, or alternatively, call handler 140 may receive, from user device 110-1, location information associated with user device 110-1 and may determine that user device 110-1 has exited uncovered zone 510 and/or has entered geographical area 505-2. Additionally, or alternatively, user device 110-1 may determine that signal power, associated with a signal received from base station 120-2, has increased to a level that is not less than a threshold and may transmit a request, to base station 120-2, to establish a connection. Base station 120-2 may receive the request and may communicate with user device 110-1 to establish the connection. Base station 120-2 may also, or alternatively, provide configuration information, to user device 110-1, that enables user device 110-1 to communicate with base station 120-2.

Returning to FIG. 4, process 400 may include re-connecting the first user device and the second user device via the call (block 435). For example, call handler 140 may cause user device 110-1 to be connected to the call as a result of user device 110-1 being connected to base station 120-2. Additionally, or alternatively, call handler 140 may reconnect user device 110-2 to the call (e.g., by taking user device 120-2 off hold) and/or by transferring user device 110-2 from the conference bridge to the call. In one example, call handler 140 may also, or alternatively, provide an audio message (e.g., via the conference bridge) to user device 110-2 that notifies a user, of user device 110-2, that the connection with user device 110-1 has been re-established.

Figure 6:
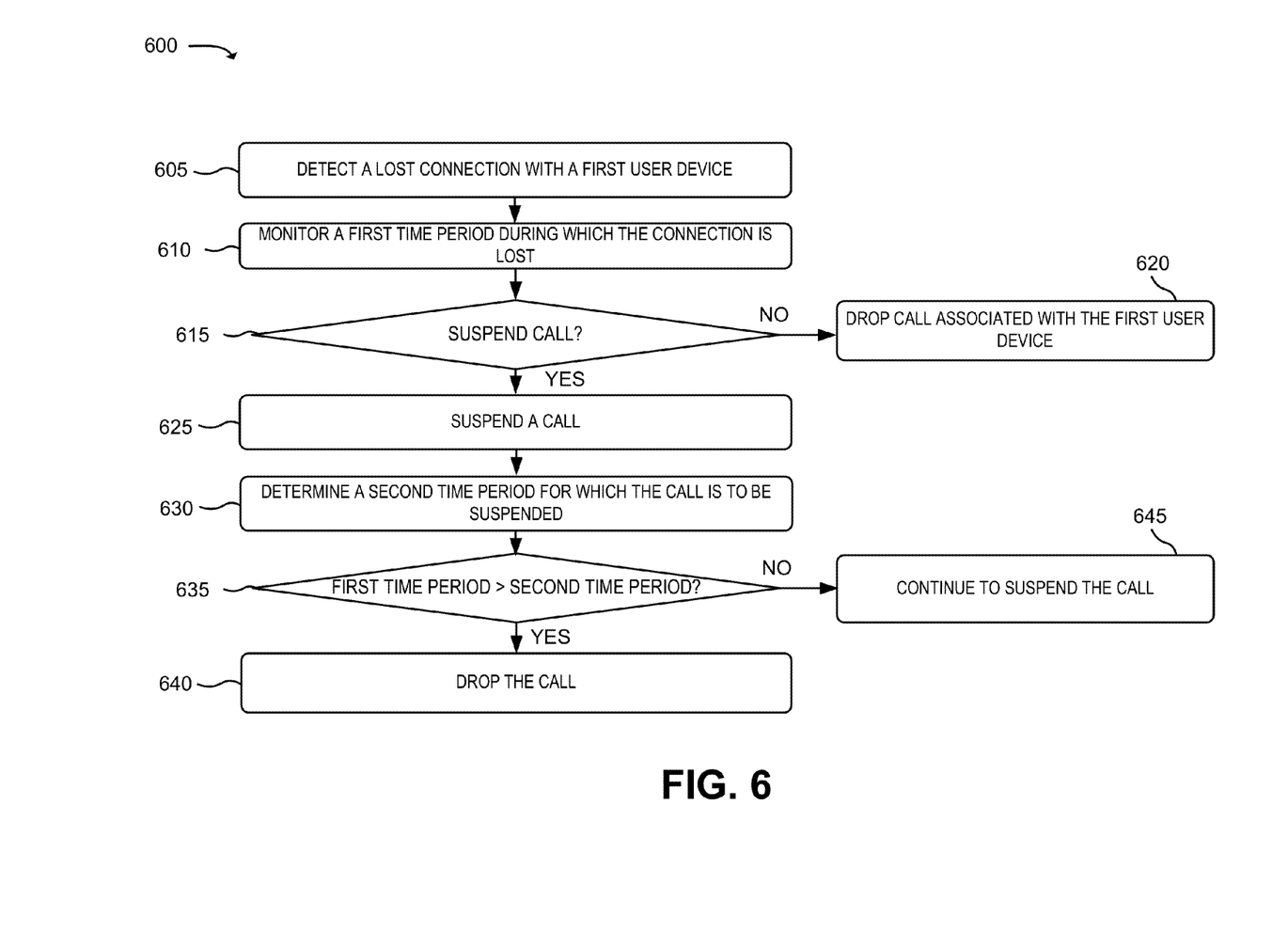
FIG. 6 is a flow chart of an example process for determining whether to drop a call based on a period of time that a connection is lost.

FIG. 6 is a flow chart of an example process 600 for determining whether to drop a call based on a period of time that a connection is lost. In one example implementation, process 600 may be performed by call handler 140. Additionally, or alternatively, some or all of process 600 may be performed by a device or collection of devices separate from, or in combination with, call handler 140.

As shown in FIG. 6, process 600 may include detecting a lost connection with a first user device (block 605) and monitoring a first time period during which the connection with the first user device is lost (block 610). For example, call handler

140 may, in a manner similar to that described above with respect to block 415 of FIG. 4, receive a notification that a connection between base station 120-1 and user device 110-1 has been lost. Call handler 140 may, based on the notification, monitor a first time period during which the connection is lost.

If a call is not to be suspended (block 615—NO), process 600 may include dropping the call associated with the first user device (block 620). For example, call handler 140 may determine whether the first time period, during which the connection is lost, is greater than a threshold (e.g., one second, two seconds, five seconds, etc.) that is predetermined by call handler 140. Call handler 140 may ignore the lost connection when the first time period is not greater than the threshold. When the first time period is greater than the threshold, call handler 140 may determine whether to suspend the call or drop the call. For example, call handler 140 may determine whether the connection is lost due to user device 110-1 entering a previously identified uncovered zone (e.g., uncovered zone 510 of FIG. 5). When the call is not lost due to user device 110-1 entering an uncovered zone, call handler 140 may cause the call to be dropped.

If a call is to be suspended (block 615—YES), process 600 may include suspending the call (block 625). For example, call handler 140 may determine that the first period of time, during which the connection is lost, is greater than the threshold. When the first time period is greater than the threshold, call handler 140 may determine whether to suspend the call or drop the call. For example, call handler 140 may determine that the connection is lost due to user device 110-1 entering the previously identified uncovered zone 510. When the call is lost due to user device 110-1 entering the uncovered zone, call handler 140 may cause the call to be suspended in a manner similar to that described above with respect to block 420 of FIG. 4.

As also shown in FIG. 6, process 600 may include determining a second time period for which the call is to be suspended (block 630). For example, call handler 140 may determine a second time period during which the call is to be suspended based another threshold (e.g., ten seconds, 20 seconds, 30 seconds, 1 minute, 2 minutes, etc.) that is predetermined by call handler 140. Additionally, or alternatively, call handler 140 may determine the second time period is based on a time during which user device 110-1 is expected to be within the uncovered zone (e.g., based on a size of the uncovered zone, a speed of user device 110, etc.). The time during which user device 110-1 is expected to be within the uncovered zone is described in greater detail below with respect to FIG. 8.

If the first time period is greater than the second time period (block 635—YES), process 600 may include dropping the call (block 640). For example, call handler 140 may determine whether the first time period, during which the call is suspended, is greater than the second time period. When the first time period is greater than the second time period, call handler 140 may instruct signal bearers (e.g., base station 120, SGW 130, and/or PGW 150) to drop the call. Additionally, or alternatively, call handler 140 may determine whether the first time period is greater than the second time period by more than a particular threshold that is based on some portion of the second time period (e.g., 5%, 10%, etc.), a fixed amount of time (e.g., 10 seconds, 30 seconds, etc.), and/or some other amount of time. In this example, call handler 140 may drop the call when the first time period is greater than the second time period by the particular threshold.

If the first time period is not greater than the second time period (block 635—NO), process 600 may include continuing to suspend the call (block 645). For example, call handler 140 may determine that the first time period is not greater than the second time period. When the first time period is not greater than the second time period, call handler 140 may instruct signal bearers (e.g., base station 120, SGW 130, and/or PGW 150) to continue to suspend the call. Additionally, or alternatively, call handler 140 may determine that the first time period is not greater than the second time period by more than the particular threshold and may cause the call to continue to be suspended.

Call handler 140 may receive a notification that the connection has been re-established with user device 110-1 and may cause user device 110-1 and user device 110-2 to be reconnected, via the call, in a manner similar to that described above with respect to block 435 of FIG. 4. However, if the first time period, during which the call continues to be suspended, becomes greater than the second time period, call handler 140 may cause the call to be dropped.

Figure 7:
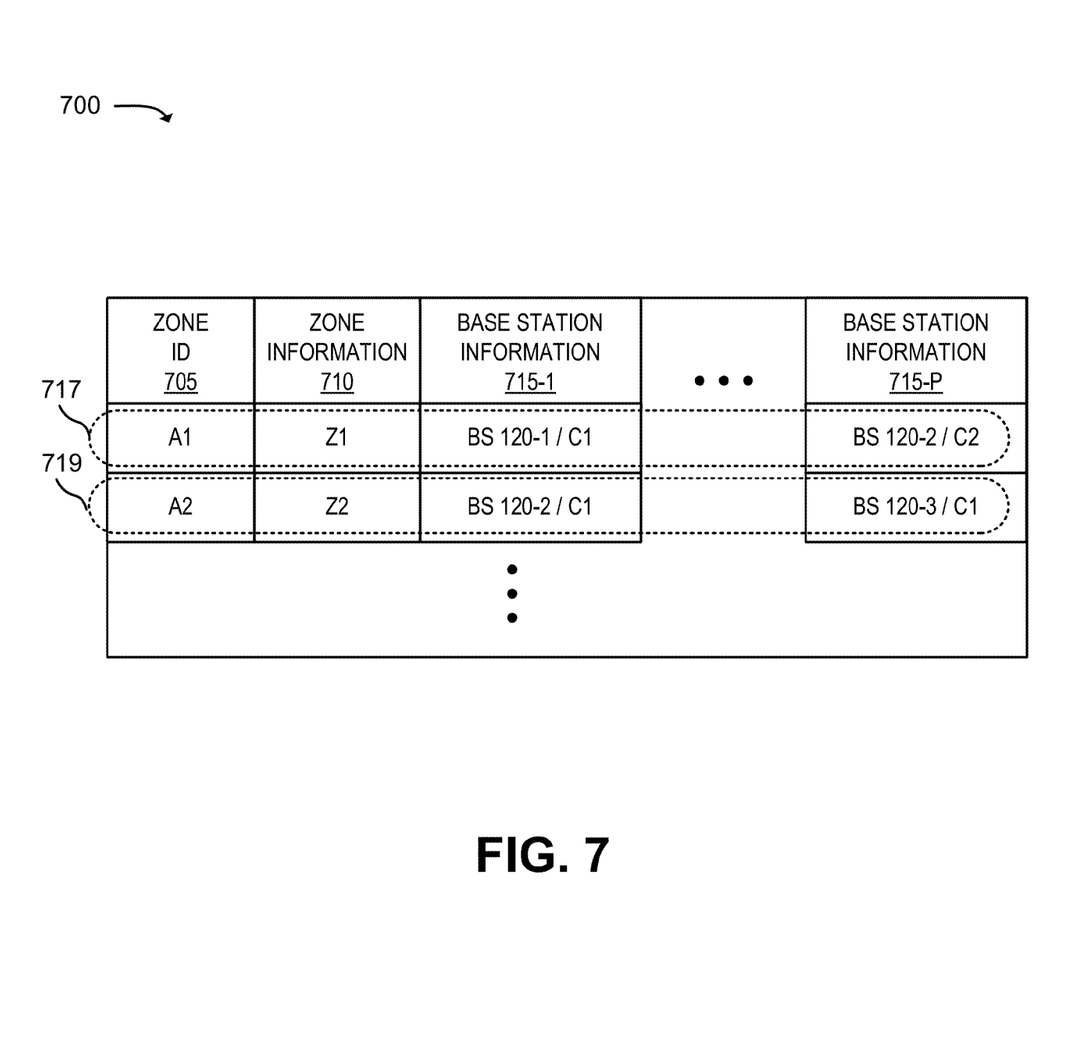
FIG. 7 is a diagram of an example data structure that stores coverage information associated with a geographical area.

FIG. 7 is a diagram of an example data structure 700 that stores coverage information associated with a geographical area. Data structure 700 may be stored in a memory associated call handler 140. As illustrated in FIG. 7, data structure 700 may include a collection of fields, such as a zone identifier (ID) field 705, a zone information field 710, and base station information fields 715-1, . . . , 715-P (where P≥1) (hereinafter referred to collectively as "base station fields 715" and individually as "base station field 715"). Fields 705-715 within data structure 700 are provided for explanatory purposes. Alternatively, or additionally, there may be additional fields, fewer fields, different fields, or differently arranged fields than are shown in FIG. 7.

Zone identifier field 705 may store information that uniquely identifies (e.g., a zone identifier, etc.) a particular uncovered zone (e.g., uncovered zone 510 of FIG. 5) within a geographical area that corresponds to environment 100. Zone information field 710 may store information that describes the particular uncovered zone. For example, zone information field 710 may store information associated with an area of the particular zone (e.g., square miles, square feet, square kilometers, etc.) and/or dimensions of the particular uncovered zone (e.g., length, width, etc.); coordinates of the particular zone within the geographical region (e.g., latitude, longitude, grid points, etc.); etc. Zone information field 710 may also, or alternatively, store information associated with environmental features of the particular zone (e.g., a body of water, a mountain, etc.) and/or transportation information associated with the particular zone (e.g., railroads, roads, speed limits, intersections, bridges, tunnels, etc.).

Base station field 715 may store information that identifies one or more base stations 120 that provide coverage to areas to which the particular uncovered zone is adjacent. For example, base station field 715 may store information associated with base station 120 and/or a cell, associated with base station 120, which provides coverage for an area that corresponds to a border of the particular uncovered zone. Base station field 715 may also, or alternatively, store information that identifies SGW 130 that serves base station 120.

By way of example, data structure 700 may store an identifier associated with an uncovered zone (e.g., A1) and/or information that identifies a size, dimensions, environmental features, and/or transportation information associated with the uncovered zone (e.g., Z1) (e.g., as shown by ellipse 717). Data structure 700 may also, or alternatively, store information that identifies a first base station 120 and/or a first cell that provides coverage that borders the uncovered zone (e.g., shown as BS 120-1/C1 by ellipse 717). Data structure 700 may also, or alternatively, store information that identifies another base station 120 and/or cell that provides coverage that borders the uncovered zone (e.g., shown as BS 120-2/C2 by ellipse 717). Data structure 700 may store coverage information associated with other uncovered zones of environment 100 (e.g., as shown by ellipse 719).

Figure 8:
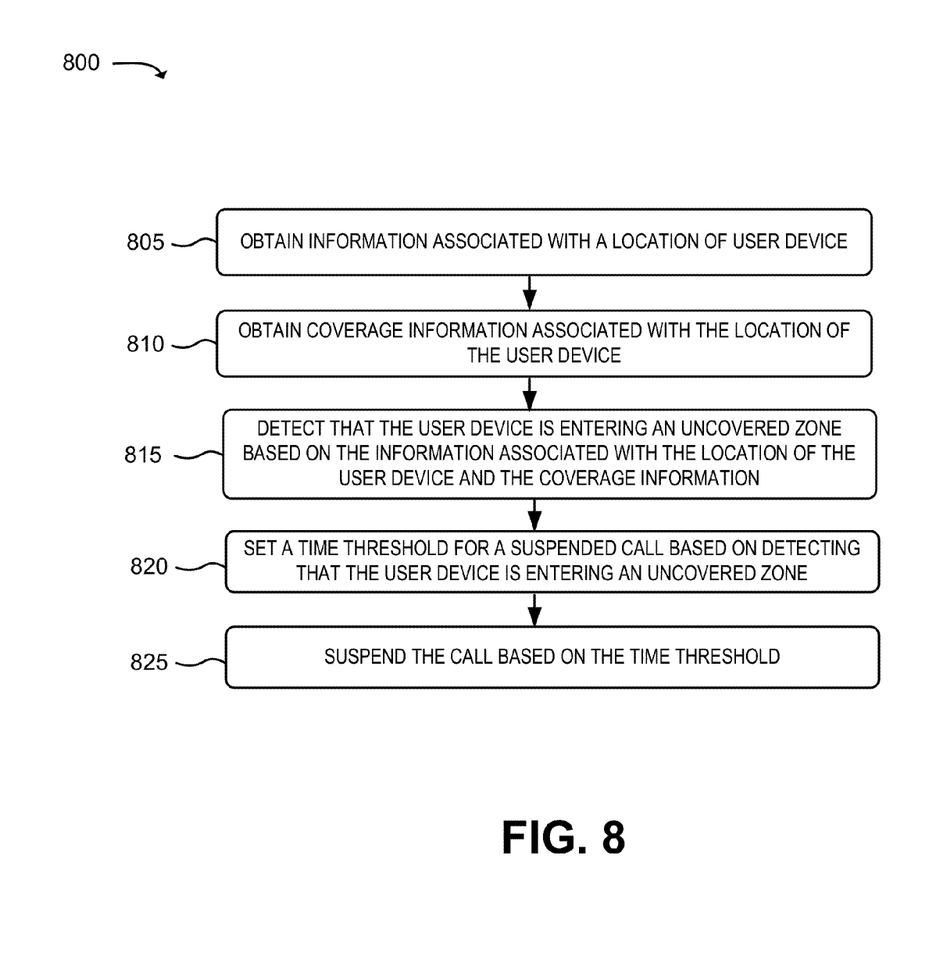
FIG. 8 is a flow chart of an example process for suspending a call based on a changing location, of a user device, within a geographical area.

FIG. 8 is a flow chart of an example process 800 for suspending a call based on a changing location, of user device 110, and coverage information. In one example implementation, process 800 may be performed by call handler 140. Additionally, or alternatively, some or all of process 800 may be performed by a device or collection of devices separate from, or in combination with, call handler 140.

As shown in FIG. 8, process 800 may include obtaining information associated with a location of a user device 110 (block 805) and obtaining coverage information associated with the location of the user device (block 810). For example, call handler 140 may obtain, via base station 120, location information associated with a location of user device 110. In one example, call handler 140 may transmit, to user device 110, a request for the location information and user device 110 may provide the location information in response to the request. Additionally, or alternatively, user device 120 may automatically provide the location information to call handler 140. Call handler 140 may also, or alternatively, identify a manner in which user device 110 is moving (e.g., based on a speed, a direction, etc.) based on the location information and/or previous location information obtained from user device 110. Additionally, or alternatively, call handler 140 may retrieve coverage information from a memory associated with call handler 140.

As also shown in FIG. 8, process 800 may include detecting that the user device is entering an uncovered zone based on the coverage information and information associated with the location of the user device (block 815). For example, call handler 140 may determine whether user device 110 is entering an uncovered zone based on the manner in which user device 110 is moving relative to an uncovered zone identified by the coverage information. In one example, call handler 140 may determine that user device 110 is entering an uncovered zone when user device 110 is moving in a direction of an uncovered zone and/or is within a distance, of the uncovered zone, that is less than a predetermined distance (e.g., 500 ft., 1000 ft., a half mile, one mile, etc.). Additionally, or alternatively, call handler 140 may determine that user device 110 is entering the uncovered zone when a rate at which user device 110 is moving toward the uncovered zone indicates that user device 110 may enter the uncovered zone within a time period that is less than predetermined time period (e.g., ten seconds, thirty seconds, one minute, etc.).

As further shown in FIG. 8, process 800 may include setting a time threshold for a suspended call based on detecting that the user device is entering the uncovered zone (block 820) and suspending the call based on the time threshold (block 825). For example, call handler 140 may estimate a time threshold that corresponds to a time during which user device 110 is expected to be within the uncovered zone. Call handler 140 may, for example, determine the time threshold based on a speed (e.g., v) at which user device 110-1 is moving and/or is expected to move, and/or a distance (e.g., d), through the uncovered zone, that user device 110-1 is to travel (e.g., $t=d/v$, where t corresponds to the time user device 110-1 is expected to be within the uncovered zone). Call handler 140 may, for example, determine the distance based a path through the uncovered zone (e.g., a train, a highway, etc.) that user device 110 is expected to travel.

Additionally, or alternatively, call handler 140 may determine the time threshold based on traffic conditions and/or posted speed limits (e.g., obtained from the coverage information) associated with the uncovered zone. In one example, call handler 140 may determine traffic conditions, associated with the uncovered zone, based on velocities and/or transit times (e.g., based on a difference between entrance and exit times) associated with other user devices 110 that have previously traveled through the uncovered zone. Additionally, or alternatively, call handler 140 may communicate, via network 170, with a server device that hosts a website that provides traffic conditions associated with a geographic area in which the uncovered zone is located. Call handler 140 may increase the time threshold when traffic conditions indicate that traffic is traveling slower than the posted speed limits and/or velocities associated with user devices 110 that previously traveled through the uncovered region.

Additionally, or alternatively, call handler 140 may cause the call to be suspended when the user enters the uncovered zone and/or when a connection between base station 120 and user device 110 is lost. Call handler 140 may, in a manner similar to that described above, with respect to block 645 of FIG. 6, cause the call to be suspend for up to a period of time that is not greater than the time threshold and/or is not greater than the time threshold by more than a predetermined threshold. Call handler 140 may, in a manner similar to that described above with respect to block 640 of FIG. 6, cause the call to be dropped when a period of time that the call is suspended is greater than the time threshold and/or is greater than the time threshold by more than the predetermined threshold.

Systems and/or methods, described herein, may enable a call handler to temporarily suspend a call when a connection with a user device, with which the call is associated, is temporarily lost. Suspending the call may enable a network, which is handling the call, to avoid dropping the call for a time period during which the connection is lost. Avoiding a dropped call may improve a user experience and may reduce resources associated with re-establishing the call.

The foregoing description provides illustration and description, but is not intended to be exhaustive or to limit the implementations to the precise form disclosed. Modifications and variations are possible in light of the above disclosure or may be acquired from practice of the embodiments.

While series of blocks have been described with regard to FIGS. 4, 6 and 8, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an application specific integrated circuit (ASIC), or a field programmable gate array (FPGA), or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   determining, by a device, that a connection with a first user device is to be lost,
      the connection being associated with a call between the first user device and a second user device;
   providing, by the device and based on determining that the connection with the first user device is to be lost, an instruction, to one or more devices, to maintain the call when the connection is lost,
      the one or more devices being responsible for processing the call,
      the instruction causing the one or more devices to not terminate at least one of signaling or protocols that are used to maintain the call when the connection is lost, and
      the one or more devices including one or more of a base station, a serving gateway, or a packet data network (PDN) gateway;
   detecting, by the device, that the connection is lost;
   providing, by the device and to the one or more devices, a first notification indicating that the connection is lost,
      the first notification causing the one or more devices to maintain the call based on the instruction to maintain the call when the connection is lost;
   detecting, by the device, that the connection is re-established; and
   providing, by the device and to the one or more devices, a second notification indicating that the connection is re-established,
      the second notification causing the one or more devices to re-establish the call between the first user device and the second user device.

2. The method of claim 1, where providing the second notification comprises:
   monitoring a period of time during which the connection is lost;
   determining that the period of time is less than a threshold; and
   providing the second notification based on determining that the period of time is less than the threshold.

3. The method of claim 1, further comprising:
   monitoring a period of time during which another connection is lost,
      the other connection being associated with another call;
   determining that the period of time is not less than the threshold; and
   dropping the other call based on determining that the period of time is not less than the threshold.

4. The method of claim 2, where the period of time is based on at least one of:
   a predetermined amount of time, or
   an amount of time that the connection is expected to be lost.

5. The method of claim 1, where determining that the connection with the first user device is to be lost includes:
   receiving, from the first user device, a notification that the first user device is entering an uncovered zone,
      the uncovered zone corresponding to a geographical area for which no coverage is provided to the first user device, and
   determining that the connection with the first user device is to be lost based on the notification.

6. The method of claim 1, where determining that the connection with the first user device is to be lost includes:
   receiving, from the first user device, location information associated with the first user device,
      the location information identifying a location of the first user device or a manner in which the first user device is moving within a geographical area;
   retrieving coverage information,
      the coverage information describing an uncovered zone, and
      the uncovered zone corresponding to a portion of the geographical area for which no coverage is provided to the first user device;
   determining that the first user device is entering the uncovered zone based on the location information and the coverage information; and
   determining that the connection with the first user device is to be lost based on determining that the first user device is entering the uncovered zone.

7. The method of claim 1, further comprising:
   providing, to the first user device and before the connection is lost, another instruction to not terminate the call when the connection is lost.

8. The method of claim 1, further comprising:
   providing, to the second user device and before the connection is lost, another instruction to not terminate the call when the connection is lost.

9. The method of claim 1, further comprising at least one of:
   placing the second user device on hold when the connection is lost; or
   connecting the second user device to a conference bridge, associated with the device, when the connection is lost.

10. The method of claim 9, further comprising:
    providing, to the second user device, a third notification when the second user device is placed on hold or when the second user device is connected to the conference bridge,
       the third notification providing, to a user of the second user device, at least one of:
          an instruction not to hang up when the connection is lost,
          a message identifying a period of time that the connection is expected to be lost, or
          content that can be viewed or listened to by the user.

11. A device comprising:
    one or more processors to:
       determine that a connection with a first user device is to be temporarily lost,
          the connection being associated with a call between the first user device and a second user device, provide, based on the indication and to one or more devices, a first instruction to maintain the call when the connection is lost,
the instruction causing the one or more devices to continue at least one of signaling or protocols that are used to maintain the call when the connection is lost, and
the one or more devices including one or more of a base station, a
serving gateway, or a packet data network (PDN) gateway,
detect that the connection is lost,
provide, to the one or more devices, a notification that the connection is lost,
the notification causing the one or more devices to maintain the call based on the first instruction to maintain the call,
determine whether a period of time, during which the connection is lost, is greater than a threshold, and
provide, to the one or more devices, a second instruction to re-establish the call between the first user device and the second user device when the connection is re-established and when the period of time is not greater than the threshold.

12. The device of claim 11, where the one or more processors are further to:
provide, to the one or more devices, a third instruction to drop the call when the period of time is greater than the threshold.

13. The device of claim 11,
where, when determining that the connection with the first user device is to be temporarily lost, the one or more processors are to:
receive, from the first user device and via the base station, another notification that the first user device is entering an uncovered zone,
the uncovered zone corresponding to a geographical area for which no coverage is provided to the first user device by the first base station,
determine that the connection with the first user device is to be temporarily lost based on the other notification, and
where the one or processors are further to:
determine, based on the other notification, that the first user device is to communicate with another base station when the first user device exits the uncovered zone, and
cause a handoff operation to be performed on the first user device based on determining that the first user device is to communicate with the other base station,
the handoff operation enabling the call to be maintained, by the other base station, when the first user device enters the uncovered zone, and
the handoff operation enabling the other base station to communicate with the first user device, to re-establish the connection,
when the first user device exits the uncovered zone.

14. The device of claim 11, where the one or more processors are further to:
provide, to the second user device, another notification indicating that the second user device is to be temporarily placed on hold or transferred to the device based on determining that the connection with the first user device is to be temporarily lost.

15. The device of claim 11, where the one or more processors are further to:
determine a time period during which the connection, with the first user device, is to be temporarily lost, and
set the threshold to be approximately equal to the time period.

16. The device of claim 11,
where, when determining that the connection with the first user device is to be temporarily lost, the one or more processors are to:
obtain location information from the first user device,
the location information identifying a location of the first user device or a manner in which the first user device is moving within a geographical area,
retrieve, from a memory associated with the device, coverage information,
the coverage information describing an uncovered zone, and
the uncovered zone corresponding to a portion of the geographical area for which no coverage is provided to the first user device,
determine a time period that the first user device is expected to be located within the uncovered zone based on a speed that the first user device is moving and a distance that the first user device is from the uncovered zone,
the speed being based on the location information, and
the distance being based on the portion of the geographical area that the first user device is expected to travel, and
determine that the connection with the first user device is to be temporarily lost based on the time period, and
where the one or more processors are further to:
set the threshold based on the time period.

17. A non-transitory computer-readable medium storing instructions, the instructions comprising:
one or more instructions, which when executed by at least one processor, cause the at least one processor to:
receive a first indication that a connection with a first user device has been lost,
the connection being associated with a call between the first user device and a second user device;
determine whether the first user device has entered a geographical area in which the first user device cannot communicate;
instruct one or more devices to suspend the call when the first user device has entered the geographical area,
suspending the call causing the one or more devices to continue at least one of signaling or protocols that are used to maintain the call when the connection with the first user device is lost, and
the one or more devices including one or more of a base station, a serving gateway, or a packet data network (PDN) gateway;
place the call on hold during a time period that the call is suspended;
receive a second indication that the connection has been re-established;
instruct the one or more devices to re-establish the call between the first user device and the second user device based on the second indication; and
remove the call from hold based on the indication that the call has been reestablished,
removing the call from hold enabling the first user device to communicate with the second user device.

18. The non-transitory computer-readable medium of claim 17, where the instructions further comprise:
one or more instructions, which when executed by the at least one processor, cause the at least one processor to:
instruct, after the connection with the first user device has been lost, the one or more devices to drop the call when the first user device has not entered the geographical area.

19. The non-transitory computer-readable medium of claim 17, where the instructions further comprise:
one or more instructions, which when executed by the at least one processor, cause the at least one processor to:
determine a period of time for which the connection has been lost;
determine whether the period of time is greater than a threshold; and
instruct the one or more devices to suspend the call when the period of time is greater than the threshold.

20. The non-transitory computer-readable medium of claim 19, where the instructions further comprise:
one or more instructions, which when executed by the at least one processor, cause the at least one processor to:
determine whether the connection can be re-established when the period of time is not greater than the threshold.

21. The non-transitory computer-readable medium of claim 17, where the one or more instructions to determine whether the first user device has entered the geographical area include:
one or more instructions, which when executed by the at least one processor, cause the at least one processor to:
determine whether the first device has entered the geographical area based on location information associated with the first user device,
the location information including at least one of:
a speed at which the first user device is traveling,
a direction that the first user device is traveling, or
a location associated with the first user device.

22. The non-transitory computer-readable medium of claim 21, where the instructions further comprise:
one or more instructions, which when executed by the at least one processor, cause the at least one processor to:
determine an expected time period that the call is to be suspended based on at least one of:
the speed at which the first user device is traveling,
a distance associated with a path, through the geographical area,
that the first user device is to travel, or
traffic conditions associated with the path that the first user device is to travel; and
drop the call when the time period, that the call is suspended, is greater
than the expected time period by an amount that is greater than a threshold.

23. The non-transitory computer-readable medium of claim 17, where the one or more instructions to place the call on hold include:
one or more instructions, which when executed by the at least one processor, cause the at least one processor to:
provide content to the second user device,
the content including at least one of:
video content,
audio content,
an instruction to not hang up while the call is suspended, or
advertising content.

24. The non-transitory computer-readable medium of claim 17, where the instructions further comprise:
one or more instructions, which when executed by the at least one processor, cause the at least one processor to:
receive, from the first user device, a notification that the first user device is entering the geographical area; and
instruct, based on the notification, the first user device to not terminate the call when the first user device enters the geographical area.

25. The non-transitory computer-readable medium of claim 17,
where the one or more devices include the base station, and
where the instructions further comprise:
one or more instructions, which when executed by the at least one processor, cause the at least one processor to:
receive, from the first user device and via the base station, a notification that the first user device is entering the geographical area; and
instruct, based on the notification and via the base station, the first user device to communicate with another base station when the first user device exits the geographical area.

* * * * *